May 29, 1956 K. FABER 2,748,195

AUTOMATIC P.B.X TELEPHONE SYSTEM

Filed Jan. 19, 1955 2 Sheets-Sheet 1

Inventor:
Karl Faber.
By. Atty.

May 29, 1956 K. FABER 2,748,195

AUTOMATIC P.B.X TELEPHONE SYSTEM

Filed Jan. 19, 1955 2 Sheets-Sheet 2

Inventor:
Karl Faber.
By. [signature] Atty.

United States Patent Office 2,748,195
Patented May 29, 1956

2,748,195

AUTOMATIC P. B. X TELEPHONE SYSTEM

Karl Faber, Munich, Germany, assignor to Siemens & Halske Aktiengesellschaft, Munich, Germany, a corporation of Germany Application January 19, 1955, Serial No. 482,899

17 Claims. (Cl. 179—18)

Figure 1:
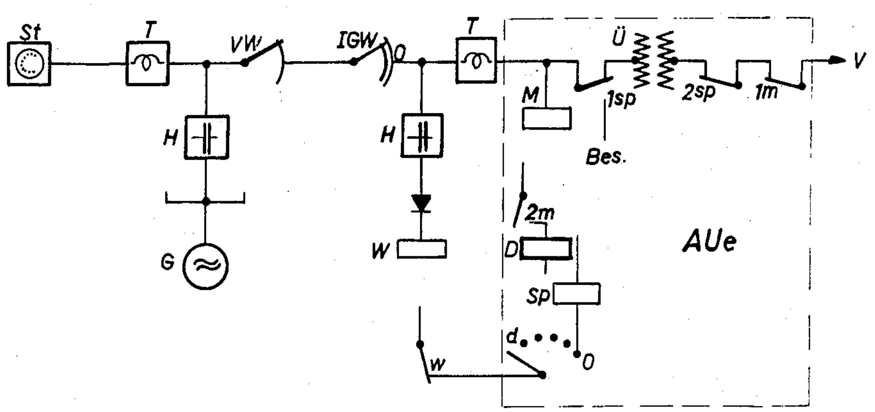

This invention relates to automatic telephone systems and is particularly concerned with circuit arrangements for automatic private branch exchanges (P. B. X) having preferred stations or lines authorized to make outside calls only within a limited zone, for example, calls terminating in a local public exchange, and having particularly privileged stations or lines authorized to make unlimited outside calls.

It is known to provide in P. B. X systems distinctions concerning the authorization of associated lines or stations to engage in calls over the public network. The distinctions involve, first, lines not authorized to make outside calls, in which case extensions to and from public exchanges are prevented as a matter of course; second, semiprivileged lines permitted to make outside calls only over certain services, usually over a P. B. X switchboard; and third, fully privileged lines having direct access to the public network.

The fully privileged lines are, with regard to their call possibilities, on equal footing with the subscribers of the public telephone network. They may, accordingly, engage in toll calls and extend calls locally as desired. The requirement to establish the charges for toll calls separately from other calls and to prevent abuse of the privilege for unauthorized purposes, led to limitations imposed on the service privileges of this preferred group, by limiting the outside calls to calls within the local charge zone. Calls destined beyond this zone, primarily toll calls, may be established by these privileged lines only over the P. B. X switchboard, the automatic extension of calls being in such cases prevented. Switching means are for this purpose provided which are upon dialing of the corresponding calls effective to prevent the automatic building up of connections.

This situation constitutes a handicap for the fully privileged lines for which there are no restrictions concerning the authorization for toll calls and no need for separately establishing the charges, because the establishment of connections by the P. B. X switchboard operator entails unnecessary delays. An unimpeded service may be obtained for such lines only by reserving for them direct trunks to the public exchange, which are independent of the P. B. X switchboard, or by gathering such lines in a group on which the switchboard restrictions are not imposed. In the latter case it will be hardly possible to avoid a subdivision of the corresponding group of trunk lines to the public exchange. Both expedients are uneconomical, requiring increased expenditures for apparatus and switching equipment and resulting in poor utilization of the trunk lines. The group formation has the further disadvantage of preventing flexible adaptation to changing requirements since the unrestricted service privilege is bound to certain subscriber lines.

It is also known to control the operation of selector switches by switching means governed by resistance-dependent authorization potentials over an auxiliary wiper for the purpose of transmitting a resistance-dependent signal over the line conductors to the exchange repeater which causes removal of the service limitation. The corresponding arrangement requires considerable expenditures.

The object of the invention is to avoid the draw-backs of prior arrangements and to satisfy with little expenditure the unlimited service requirements of fully privileged stations. This object is according to the invention accomplished by the provision of means for connecting in the P. B. X board to the line conductors of a particularly privileged station an alternating voltage with a frequency lying outside the audible range so as to affect thereby switching means which cancel the service restrictions.

In accordance with the invention, an alternating voltage is preferably used having a frequency lying above speech frequencies, for example, a frequency of 20 kc. It is, however, also possible to use a frequency lying below the speech frequencies. It is at any rate essential that the alternating voltage used does not affect the building up of calls and does not disturb conversation and that the switching means for canceling the service restrictions are not affected by P. B. X stations.

The invention will now be explained with reference to the accompanying diagrammatic drawings. In these drawings, Fig. 1 shows the essentials of the invention in schematic manner; and Figs. 2, 3 and 4 indicate various modes of connecting the service criterion to the lines of stations.

Referring now to Fig. 1, there is shown, as an example, a P. B. X in which fully privileged stations, after dialing an exchange digit, in the assumed example digit "0" can over a first group selector seize an exchange transmitter AU*e* associated with a trunk line extending to the public exchange V. It is understood, of course, that the invention is not inherently limited to P. B. X installations of this particular type.

The digits originating at the station S*t* are received by a relay M in the exchange transmitter, the relay M retransmitting the corresponding impulses in the form of loop interruptions to the public exchange. An associated switch, essentially a rotary switch D, is at the same time set by a contact 2*m* of the relay M in accordance with the impulses received. It is in the present example assumed that the automatic completion of calls which are marked by the first toll digit "0" as not belonging to the local zone is to be prevented. If the calling station dials this digit after having seized an idle exchange trunk and after having received the dial tone from the public exchange V, the auxiliary switch in the exchange transmitter will execute ten steps and its switch wiper *d* is accordingly advanced to the position "0" in which is closed a circuit for the energization of the blocking relay S*p*. The relay S*p* upon energizing opens the line conductors at its contacts 1*sp* and connects the busy tone B*es* so as to inform the calling line that the attempted call is unauthorized and that he should hang up. As indicated, the relay S*p*, by actuating its contact 2*sp* may at the same time release, independent of the hanging up of the calling party, the switching devices already set by the first digit in the exchange, thereby preventing unnecessary withdrawal of these devices from the service.

The foregoing explanations apply to calls from privileged stations with restricted service authorization. Stations with unrestricted service authorization are in accordance with the invention characterized by connecting thereto a criterion which is for purposes of explanation represented by a station identifying alternating voltage delivered by a generator G, the frequency of such voltage being above the audible range. This alternating voltage causes upon seizure of the exchange transmitter AU*e* energization of a relay W which is disposed between the transmitter AU*e* and the group selector IGW and connected to the line conductors. The relay W, upon operating, interrupts at its contact *w* the circuit for the blocking relay S*p*, thus enabling the calling party to extend the call automatically responsive to dialing the digit "0".

In order to keep the damping low, the generator G and the relay W are each connected to the talking path over a high pass H. A leakage of the station identifying current to the calling party and to the exchange is prevented by the low pass devices T. The generator G is common to all P. B. X lines while the low- and high-pass devices and the relay W are respectively individual to P. B. X lines and to the exchange transmitters.

So far as the structural arrangement is concerned, the relay and the filters at the exchange side could be combined with the exchange transmitter or could be switched in into the line between these and first group selectors. The relay W, in the case of low frequency marking voltage, may be a resonant relay tuned to the corresponding frequency. In case of high-frequency station identifying signals, a direct current relay may be used and connected over rectifiers. Faulty actuation of these relays responsive to other potentials on the line is prevented by the high pass filters H.

In the embodiment shown in Fig. 1, the characteristic alternating voltage station signal is always connected to the corresponding line, even during interoffice calls and incident to incoming calls when it is not needed. If this is undesired for reasons of transmission requirements, the arrangement may in accordance with another feature of the invention be such that the station identifying criterion is connected only incident to out-going calls and in particularly advantageous manner only during the receipt of the dial pulses. Corresponding embodiments are shown in Figs. 2, 3 and 4.

Figure 2:
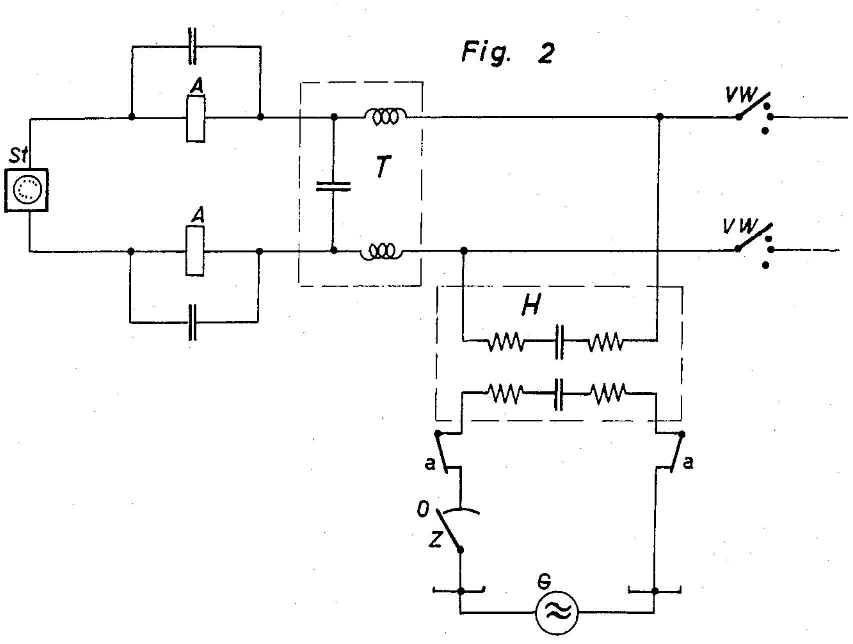

In accordance with Fig. 2, there is provided a relay A in the line conductors of a station S*t*, which is energized by the microphone current responsive to removal of the receiver. Relay A, upon operating disconnects generator G at its contact *a*. During the dialing, the relay A is actuated in step with the dial pulses, thereby connecting the alternating station identifying potential accordingly. Such potential is furthermore disconnected in the normal position of the preselector switch by wiper *z* of such switch so that it is removed from the line conductors incident to incoming calls while the relay A is still in normal position. Fig. 2 also shows a particularly advantageous arrangement of the high pass filter H as a repeater so far as the symmetry is concerned.

The disposal of the relay A in the line conductors causes a certain damping that may under certain circumstances be undesirable. Such damping may be avoided, in accordance with another feature of the invention, by connecting the generator G with the line in a blocking circuit in the form of an opposition modulator, as shown in Fig. 3. The underlying reasoning proceeds from the fact that the normal operating voltage is exceeded by the voltage surges over the line occurring during the transmission of the dial pulses. These are essentially induction surges occurring incident to the pulsing interruption of the subscriber's line which are traceable above all to self-induction of the battery feed relay and in a lesser degree to the line itself. These potential surges are equalized over a series circuit comprising a glow lamp G*l* and a capacitor C bridging the line conductors inasmuch as they reach or exceed the firing potential of the glow tube. The capacitor is at the same time connected between the symmetry points of the two transmitters of the opposition modulator to which is otherwise connected the frequency to be modulated. So long as there is no potential on the capacitor, the modulator is blocked and does not transmit to the line the alternating voltage of the generator G. A capacitor potential will occur as soon as the glow tube fires. It cancels the blocking action of the modulator. The alternating voltage reaches the line during this interval. The damping is in such circuit extraordinarily low and depends essentially only on the characteristics of the repeater on the line-end which is again formed as high pass filter.

Figure 3:
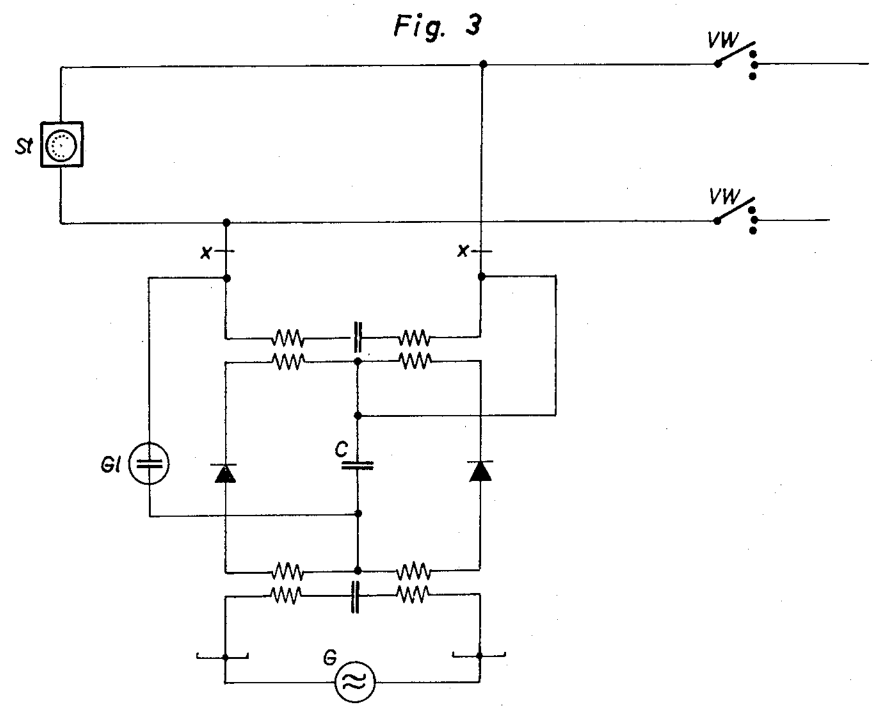
Figure 4:
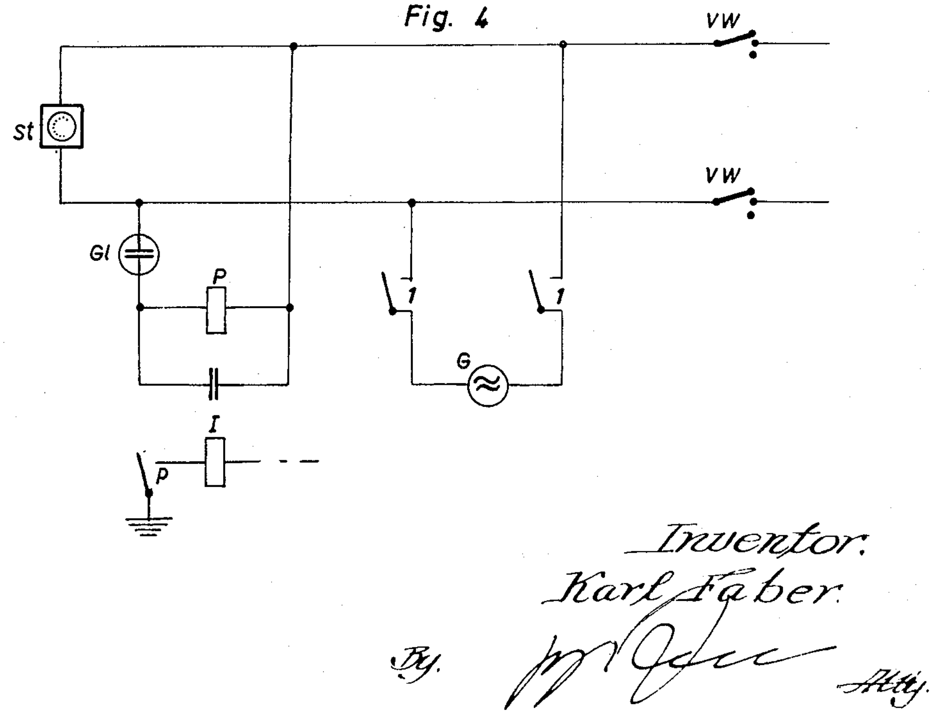

The arrangement according to Fig. 3 has the further advantage that a low pass filter in the subscriber end of the line can be dispensed with since the station identifying or discriminating frequency can reach the line exclusively during the dial pulsing, a leakage of the alternating current to the subscriber being prevented due to the fact, derivable from the above explanations, that the current flows only during times when the line loop is interrupted at the impulse contacts of the subscriber's dial. The circuit is thereby simplified to such extent that the switching-in of the characteristic station identifying signal can be effected or cancelled at the exchange at any time by simple means and without further affecting the subscriber's line. It is particularly advantageous to use for this purpose instead of the fixed connection *x* of Fig. 3, manually operable switching means, for example, switches, keys, plugs and the like. This expedient is, of course, principally applicable in the embodiments explained with reference to the other examples, although the expenditure on switching means will thereby be somewhat increased.

The embodiment according to Fig. 4 operates in accordance with the same principle as that of Fig. 3. The induction surges over the glow tube G*l* cause pulsewise energization of a relay P which causes corresponding energization of relay I. The latter relay, at its contact 1 connects the station identifying frequency to the subscriber line.

It may be said in conclusion that the station identifying signal must be stored in the exchange transmitter AU*e* in case it is connected only during the dial pulsing as in Figs. 2, 3 and 4. The relay W may for this purpose be provided, for example, with a second holding winding which depends on a contact of such relay and a contact of a seizure relay in the exchange transmitter set.

Changes may be made within the scope and spirit of the appended claims in which is defined what is believed to be new and desired to have protected by Letters Patent.

I claim:

1. In an automatic private branch exchange telephone system having semiprivileged lines entitled to make outside calls limited to a predetermined zone and having fully privileged lines entitled to make, responsive to dialing a predetermined number, outside calls extending beyond such zone, first switching means responsive to the dialing of said predetermined number by a semiprivileged line for preventing the setting up of the corresponding call to a zone beyond said predetermined zone, second switching means, a source having a frequency lying outside the audible range, circuit means for connecting said source to a fully privileged line for the purpose of operatively affecting said second switching means, and means actuated by said second switching means upon extension of a call from said fully privileged line for inhibiting the operative actuation of said first switching means to permit said fully privileged line to extend the corresponding call to a zone beyond said predetermined zone.

2. A system and cooperation of parts as defined in claim 1, comprising a trunk line extending from said private branch exchange to a public exchange, a connecting device allotted to said trunk line, and a relay constituting said second switching means forming part of said connecting device.

3. A system and cooperation of parts as defined in claim 2, wherein the frequency of said source is a frequency lying above the audible range, low pass filter means for blocking the talking path against said frequency, and high pass filter means for blocking said current source and said relay against speech frequencies.

4. A system and cooperation of parts as defined in claim 1, comprising a stepping switch responsive to dial pulses denoting said predetermined number, control circuit means governed by said stepping switch for controlling the operation of said first switching means, and circuit means governed by said second switching means for controlling said control circuit means.

5. A system and cooperation of parts as defined in claim 1, comprising selectively operable means for connecting said frequency source to a fully privileged line.

6. A system and cooperation of parts as defined in claim 1, comprising circuit means for relatively fixedly connecting said frequency source with said fully privileged line.

7. A system and cooperation of parts as defined in claim 1, comprising means for connecting said frequency source with said fully privileged line incident to calls outgoing from said line.

8. A system and cooperation of parts as defined in claim 1, comprising means for connecting said frequency source with said fully privileged line during the transmission of dial pulses from said line.

9. A system and cooperation of parts as defined in claim 1, comprising means for connecting said frequency source with said fully privileged line during the pauses between dial pulses transmitted from said line.

10. A system and cooperation of parts as defined in claim 6, comprising relay means included in the line loop of said fully privileged line and actuated by battery feed current for disconnecting said frequency source from said line.

11. A system and cooperation of parts as defined in claim 8, comprising relay means included in the line loop of said fully privileged line and actuated by battery feed current for disconnecting said frequency source from said line.

12. A system and cooperation of parts as defined in claim 10, having a preselector comprising normally open contact means for disconnecting said frequency source from said line.

13. A system and cooperation of parts as defined in claim 11, having a preselector comprising normally open contact means for disconnecting said frequency source from said line.

14. A system and cooperation of parts as defined in claim 3, comprising circuit means including said high pass filter means for connecting said frequency source with said fully privileged line.

15. A system and cooperation of parts as defined in claim 8, comprising a trunk line extending from said private branch exchange to a public exchange, a connecting device allotted to said trunk line, and means in said connecting device for storing the frequency criterion connected to said fully privileged line.

16. A system and cooperation of parts as defined in claim 8, comprising an opposition modulator forming a blocking circuit for connecting said frequency source with said fully privileged line, the blocking action of said circuit being cancelled over a discharge path included therein by compensation of voltage surges occurring during the transmission of said dial pulses.

17. A system and cooperation of parts as defined in claim 8, comprising a connecting relay having contacts controlled thereby for connecting said frequency source with said fully privileged line, a control relay for governing the actuation of said connecting relay, and circuit means including a discharge path operatively responsive to voltage surges occurring during the transmission of said dial pulses for actuating said control relay to cause corresponding actuation of said connecting relay.

References Cited in the file of this patent

UNITED STATES PATENTS

| | | |
|---|---|---|
| 1,960,037 | Williams et al. | May 22, 1934 |
| 2,005,595 | Roome et al. | June 18, 1935 |